INVENTOR
KONRAD ZUSE

Dec. 5, 1967 K. ZUSE 3,356,852
PHOTOELECTRIC HEADLIGHT ROTATOR RESPONSIVE
TO ONCOMING HEADLIGHTS
Filed Aug. 20, 1964 4 Sheets-Sheet 2
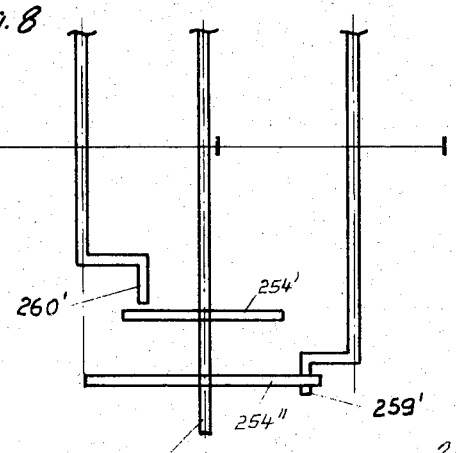
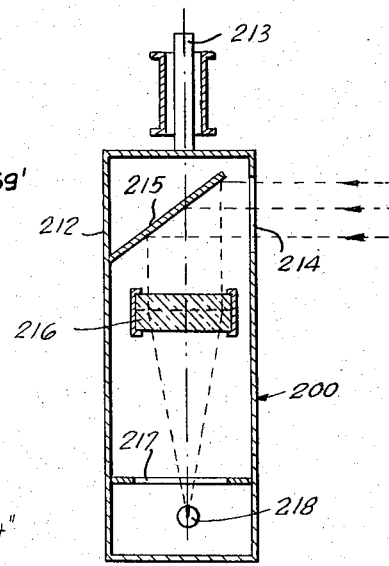
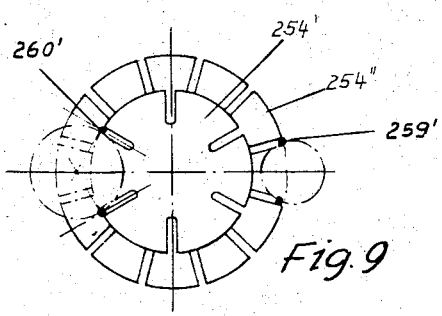
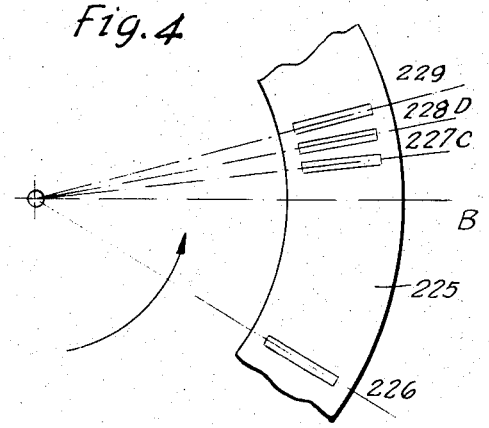
INVENTOR
KONRAD ZUSE
By Silverman & Cass
Attorneys Dec. 5, 1967  K. ZUSE  3,356,852
PHOTOELECTRIC HEADLIGHT ROTATOR RESPONSIVE
TO ONCOMING HEADLIGHTS
Filed Aug. 20, 1964  4 Sheets-Sheet 3

INVENTOR
KONRAD ZUSE

By Silverman & Cass

Attorneys

United States Patent Office 3,356,852
Patented Dec. 5, 1967

3,356,852
PHOTOELECTRIC HEADLIGHT ROTATOR RESPONSIVE TO ONCOMING HEADLIGHTS
Konrad Zuse, 21 Im Haselgrund,
6418 Hunfeld, Germany
Filed Aug. 20, 1964, Ser. No. 390,861
Claims priority, application Germany, Aug. 23, 1963,
Z 10,313
13 Claims. (Cl. 250—214)

ABSTRACT OF THE DISCLOSURE

A lighting apparatus having a continuously revolving receptor and comparator. The receptor and comparator send photoelectric signals to a storage device which transfers the electrical energy to a mechanical drive arrangement for rotating a headlamp in predetermined steps away from an oncoming vehicle. The receptor detects the presence and angle of light from an approaching vehicle. The comparator supplies an electrical signal to the storage device representing a comparison of the angular position of the receptor and to rotating headlamp. The storage device controls the dimming of the lamp as well as the rotation of the headlamp, to the right or to the left.

---

This invention relates to illuminating devices for moving vehicles and more particularly to a control arrangement for automobile headlights for limiting the direction in which such head lights cast beams ahead to prevent the possibility of casting illuminating beams in directions which correspond to the directions from which opposite beams are received from approaching vehicles.

It has been known heretofore to control the direction in which illuminating beams from a motor vehicle are cast by analogue responsive steering arrangements for illuminating beam originating lamps. Thus, there have been known arrangements in which a light beam steering arrangement makes continuous examination of an ahead sector and makes corresponding continuous adjustment of an associated beam casting lamp on the vehicle equipped with the known apparatus. In such arrangements, the steering devices adjust the illuminating head lamp in direction so that the ahead cast beam was limited in the direction from which light from ahead was received. Unhappily, however, such analogue feed-back arrangements were beset by oscillations in the associated light controlling drive systems.

As a consequence, oscillations resulted in the direction of ahead cast beams. Such oscillations oftentimes resulted in casting an ahead illuminating beam directly and blindingly at the driver of an approaching vehicle.

Accordingly, it is an object of the present invention to eliminate this danger of analogue lamp controlling systems and to provide a definite and certain, stepped control system for directing illumination from vehicle-mounted lamps away from an approaching vehicle.

It is a further object of the invention to provide a buffer storage system for further insuring against the occurrence of dangerous oscillations in lamp directing drive systems.

It is a still further object of the invention to provide illumination monitoring arrangements for monitoring the direction from which approaching illumination may be cast on a vehicle equipped with apparatus in accordance with the invention, for preventing the casting of illuminating beams in the direction from which illumination was received.

The accomplishment of these objects and further features and advantages of the invention will be more clear from a consideration of the following brief description of an illustrative embodiment of the invention shown in the drawings and from a consideration of the appended claims.

In the drawings:

FIG. 2 is a sectioned elevation view of an important monitoring structural element of apparatus in accordance with the invention;

FIG. 4 is a plan view of a portion of a slotted plate element for cooperation with the apparatus illustrated in FIG. 3;

FIG. 8 is an elevation view of an alternatively advantageous structural element for the drive arrangement of FIG. 7;

FIG. 9 is a plan view of the drive element of FIG. 8.

The invention comprises generally a head lamp source of directive illumination driven in successive steps of rotation about a vertical axis under control of a storage system. Also, continuously driven together in cooperative rotation about a co-linear axis are a comparator arrangement and a receptor. The receptor scans sectors of the horizontal region about the vehicle in which apparatus in accordance with the invention is advantageously mounted. The like rotating comparator, meanwhile, generates an internal light signal which is modulated by a slotted plate coupled mechanically to the lamp.

The so modulated light signal generates an appropriate control signal for application to, and processing by a storage system. To this same storage system are applied electrical signals indicative of the angular positioning of light incident on the aforementioned scanning receptor.

Thus, from the storage system are derived two signals. The one controls dimming of the lamp and the other controls drive of this lamp in rotary steps, right or left, to avoid illumination of the approaching vehicle from which light signals have been incident on the aforementioned scanning receptor.

Figure 1:
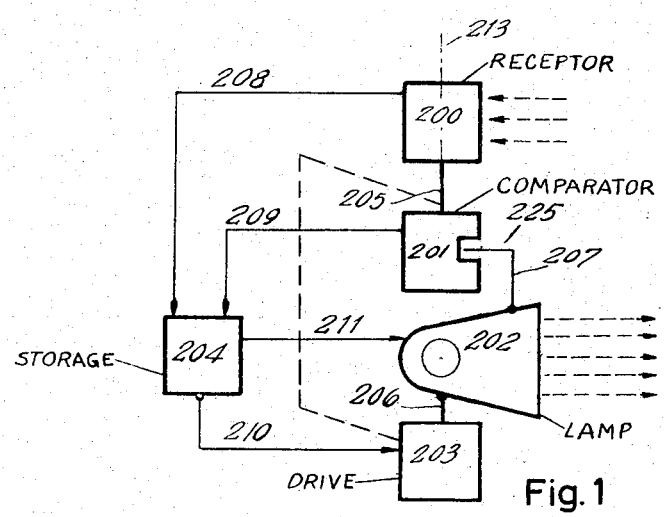
FIG. 1 is a functional block diagram of a complete system in accordance with the invention.

Referring now more particularly to the drawings, in the diagram of FIG. 1 there is shown a substantially conventional automobile head lamp and reflector 202 mounted for rotation on a vertical shaft 206 having a central axis 213, under drive of drive mechanism 203. Ahead cast light beams from lamp 202 are indicated by the dashed arrows. A receptor 200 and a comparator 201 are mounted for rotation on a common shaft 205 which is co-linear with the axis of rotation 206 of the lamp 202.

As indicated by dashed lines, this shaft 205 is driven in rotation by a continuously operating motor 263 included in drive mechanism 203. The comparator 201 comprises a convex configured portion, as illustrated, for reception of the corresponding horizontal slotted plate 225. This slotted plate is fixed by way of member 207 to the lamp 202 for rotation therewith. This horizontal slotted plate 225 as appears more clearly in consideration of FIG. 4, is a portion of a circular arc centered about the axes 206 and 213 which, it will be recalled, are colinear.

The receptor 200, as noted heretofore, is mounted in common with the comparator 201 for rotation about an axis 205. This rotation is accomplished under urging of the drive mechanism 203 and the continuously operating drive motor included therein. Thus, the receptor which includes a viewing sector defining aperture, continuously scans sectors describing a complete circle about the receptor 200 and the vehicle on which apparatus in accordance with the invention is mounted.

Figure 3:
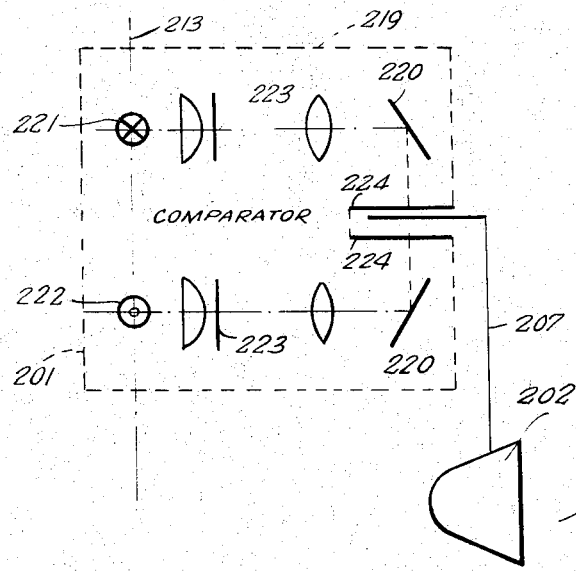
FIG. 3 is a diagram of an important optical comparator element for employment in apparatus in accordance with the invention.

As appears in greater detail in consideration of FIG. 3, the comparator 201 comprises internal illumination and optically responsive systems for applying an electrical signal along lead 209. This electrical signal represents a comparison of the angular position of the receptor and the lamp 202. The receptor 200 in turn supplies an optically generated electrical signal along lead 208 representative of the incidence of light from source in the sectors scanned. Such light incident upon the receptor is indicated by the dashed line, left headed arrows.

These two electrical signals on leads 208, 209 are applied to a storage circuit 204 for processing, as described in more detail in connection with discussion of FIG. 6, and for generation of an output control signal on lead 210 for application in controlling relation to drive arrangement 203. This drive arrangement 203 is discussed more fully in connection with the discussion of FIG. 7 and is arranged for rotating the lamp 202 about the axis 206 in discrete steps corresponding to control signals appearing on lead 210 from the storage arrangement 204.

Turning next to FIG. 2. Here is shown in sectioned elevation view the receptor 200 which, it will be recalled from the discussion of FIG. 1, is mounted for rotation about an axis 213 under drive of the drive arrangement 203 for scanning a circle about the vehicle on which apparatus in accordance with the invention is mounted. Light from an approaching vehicle in the circle so scanned is indicated by the dashed arrowed lines approaching the housing 212 and entering therein by way of aperture 214. Upon entry of the light through aperture 214 this light is incident on a reflector 215, thence, the light beam so incident of the receptor 200 are directed through an optical system 216 to pass through an aperture 217 for focusing on a photoelectric cell 218. The light so focussed thereby generates an electrical signal from the receptor at an angular position of that receptor about the axis 213 corresponding to the position of an illuminating object in the sector ahead. Such an illuminating object, of course, normally comprises the head light of an approaching motor vehicle.

Turning next to FIG. 3, there is seen in functional outline the comparator 201 having the slotted plate 225 disposed in cooperative relation therewith and mounted, by mounting member 207, on the rotatably mounted lamp 202. The opaque housing 219 is provided for the comparator 201 and is indicated in the main by dashed lines. An internal light source 221 and a cooperative photocell 222 are provided, mounted one above the other within the housing 219, along the axis of rotation 213 of that housing. As indicated, an optical system 223 is provided for forming a slit of light from the source 221 for reflection against the mirror 220, for passage through single slots in a pair of horizontal members 224 against a lower mirror 220 and, through a companion optical system, to a well known photocell 222 for generation of an electrical signal indicative of the comparison of the rotary position of the lamp 202 and the comparison head 201. In this FIG. 3, it has been observed, that light reflected from the upper mirror 220 passes through the plate 225 for performing comparison functions which become more clear in consideration of the plan view of FIG. 4.

Turning next to this FIG. 4, there is seen in plan view the configuration of this slotted plate 225 which rotates in correspondence with the rotational movement of the lamp 202 about axis 213. The plate 225 comprises four radial slots 226, 227, 228 and 229. The four slots successively define angular scanned sectors B, C, and D. A fourth sector F is defined between the last and first of these slots 229, 226. Thus, if appropriate angular relationships exist, a light slit from optical system 223 is enabled to pass from the upper mirror 220 through the slotted horizontal members 224 and through one of the radial slots 226–229. Such a passage, recalling the discussion of FIG. 3, leads to the incidence of the light slit on the photocell 222 for giving rise to an electrical signal in well known fashion for passage along lead 209 to the storage arrangement 204. By appropriate radial positioning of plate 225, this signal is indicative of the inspection by receptor 200 of the zone corresponding to the right hand edge on the light beam from lamp 202.

Figure 5:
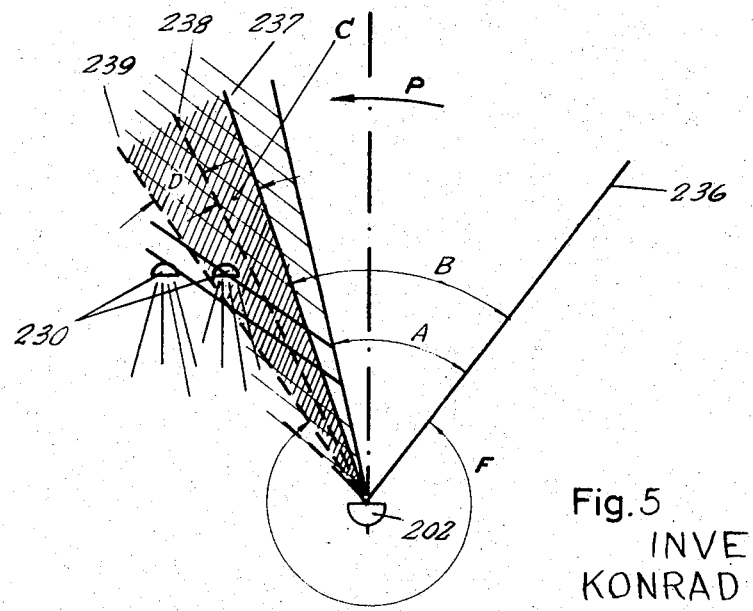
FIG. 5 is a diagram of asistance in understanding the relational employments of illuminating apparatus in accordance with the invention in relation to illuminating elements of an approaching vehicle.

Turning next to the diagram of FIG. 5, the effective spatial relationships of these several elements is more clear. For simplicity, it is best considered for the moment that the lamp 202 is stationary and the comparator housing continuously rotates counterclockwise. In this figure the reflector-lamp arrangement 202 is arranged for directing a light beam in the arc lying between radii corresponding to the slots 226, 227 noted heretofore. Full illumination is along the sector indicated by the curved arrow A and at least fringe illumination exists through the entire sector indicated by the curved arrow B. No illumination is indicated in the further sequential circular sectors C, D, F. Sector B, of course, includes sector A.

Now these diagram illustrated sectors A, B, C, D, F serve further to define sectors scanned by the receptor 200. For apparatus in accordance with the invention the sector A has no structural significance beyond that of completeness in discussing the illumination patterns associated with the lamp. We have hypothesized, for ease in visualization, that the receptor rotates counterclockwise. This is indicated by curved arrow P, while the lamp is stationary.

The receptor successively then scans the sectors B, C, D, F. Inviting attention to the disposition of slotted plate 225 (see FIG. 4) between the slotted plates 224 of comparator 201, it is clear that the counter clockwise rotation of receptor 200 (and comparator 201) successively scans these several sectors B, C, D, F for detecting the presence of any light source in these sectors which are defined by the radiation patterns of the instantaneously (and hypothetically) stationary lamp 202.

Figure 6:
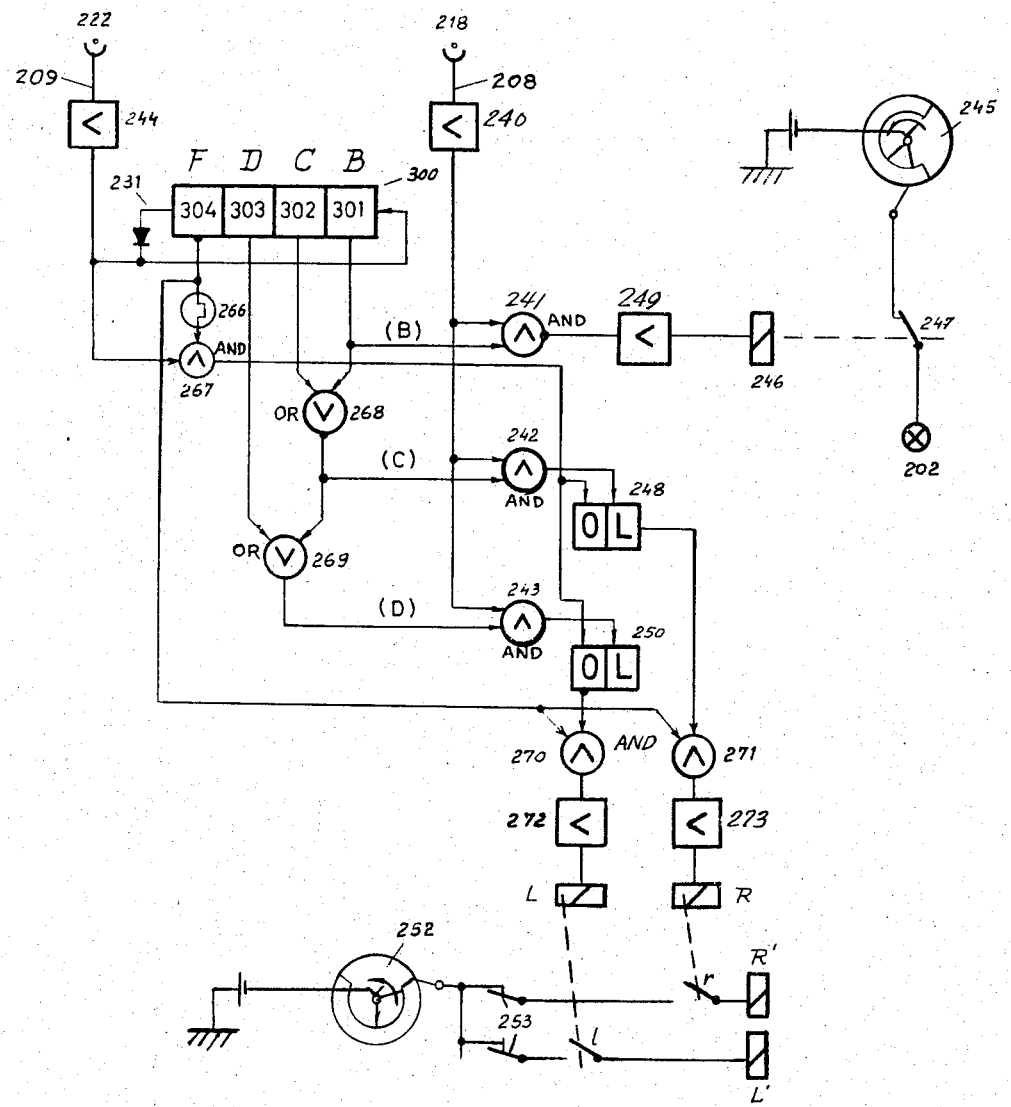
FIG. 6 is a functional diagram of control circuits for employment and control of apparatus in accordance with the invention.

As will appear hereafter, in consideration of FIG. 6, apparatus in accordance with the invention provides for eliminating signals from receptor 200 during the period of scanning region B to preclude illumination of this receptor by the associated lamp 202.

Recognizing then that the zones defined in the diagram of FIG. 5 are relative to the instantaneous lamp orientation with respect to the continuously rotating receptor 200, we may proceed with consideration of this FIG. 5.

A pair of head lamps 230 are shown directing illumination from a position between the radii 238, 239 corresponding to the slots 228, 229. This sector is designated D and an adjacent sector to the right, between radii 237, 238, is designated C. Now with reference to FIGS. 3, 4 and 5, let us examine the cooperative behavior of apparatus of the invention discussed heretofore. As the slit 224 passes over the slit 226 in plate 225, an electrical signal is generated. Thus, after the comparator slots 224 pass over the slot 226, no signal occurs along the lead 209 until the slots 224 come into coincidence with slot 227. Thus, throughout this time, the receptor 200, mounted for rotation with comparator 201, observes no light signal as from the head lamps 230. Then after the slot 224 passes over the slot 237, a signal on this lead 209 indicates the beginning of a scanning period for the sector C. Turning next to the control arrangements of FIG. 6, we see the photocells 218 and 222, respectively associated with the receptor 200 and the comparison arrangement 201.

A ring counter 300 is provided having successive stages 301, 302, 303 and 304. The terminal stage 304 is connected by way of lead 231, including a diode, as shown, to the first stage 301. The comparator output lead 209 and the receptor output lead 208 are respectively connected by way of amplifiers 244 and 240 as shown. The output of amplifier 244 provides an input to the first stage 301 of the ring counter 300. Counter stages 301, 302 and 303, respectively, have connections to one input terminal of OR circuits 268 and 269. The output terminal of OR circuit 268 is connected to the remaining input terminal of OR circuit 269.

The receptor amplifier 240 has a common connection to one input terminal of each of AND circuits 241, 242, and 243. The remaining input terminals of these AND circuits are respectively connected to receive signals from ring counter stage 301, OR circuit 268 and OR circuit 269, respectively.

Amplifier 244 also has an output connected to one input of AND circuit 267. Counter teriminal stage 304 provides an input to AND circuits 270 and 271. A second input to AND circuit 267 is received by way of delay line 266 from the terminal output stage of the ring counter 300. The output of this latter AND circuit is applied in common to one side of flip-flop circuits 248, 250. The other side of these flip-flops are respectively connected to receive inputs from AND circuits 242 and 243, respectively. In the shifted state flip-flop 248 provides an output to AND circuit 271 and in the zero state, flip-flop 250 provides an output to AND circuit 270. These latter two AND circuits respectively provide through amplifiers 272 and 273 signals to left and right controlling relays, L, R for controlling the direction of rotation of the lamp 202, seen in FIG. 1.

A contact plate 245 is provided for mounting on the under side of receptor 200 to complete an energizing circuit for lamp 202. As illustrated, this contact plate angularly corresponds to scanning of the region F by the receptor 200. Thus, it is precluded that the lamp 202 be a source of illumination for the receptor 200 in the scanning of sector B by receptor 200. If the lamp were normally illuminated, a signal received by the receptor 200 is applied to the photocell 218. The amplifier 249 and relay 246 are energized by closure of AND circuit 241 upon receipt of a signal from counter stage 301. Thus, switch 247 is opened to dim the lamp 202.

Let us look to the overall operation of the circuits heeretofore described. As the comparator slits 224 successively sweeps over the slots 226-229 of plate 225, signals are derived on lead 209 for application to the ring counter 300. Recalling that the comparator sweeps in correspondence with the scanning positioning of the receptor 200, stepping signals are applied to this ring counter corresponding to the surveillance of regions B, C, D and F by the receptor 200. At the start of the surveillance of these several sectors, the stages 301, 302, 303 and 304 are successively shifted to provide signals for one input of the associated two-input circuits. Accordingly, during the scanning of region B and C by the receptor, signals are successively applied to the two inputs of OR circuit 268 to provide an output therefrom to one input of the AND circuit 242. Further, when either stages 301 or 302 is shifted, a signal is applied to one input of OR circuit 269 as well. When region D is scanned, a signal is applied to the remaining terminal of OR circuit 269. As is well known in the art, in the condition that only one input terminal of these OR circuits is energized, an output signal is provided to one terminal of AND circuit 242 or 243. These AND circuits in turn have outputs to flip-flops 248 and 250, respectively. Flip-flop 248 in a switched condition provides one input to an AND circuit 271 and flip-flop 250 in a zero condition provides a signal to the AND circuit 270. Both these AND circuits 270 and 271 receive inputs to their remaining terminals in the condition that region F is scanned by the receptor 218 corresponding to a shifted condition of the stage 304.

To now we have neglected the behavior of the delay line element 266 connected between the output of counter circuit element 304 corresponding to the surveillance of region F as seen in FIG. 5. Recalling that the successive slots 226-229 cause successive stepping of the stages B-F, it is clear that stage F, or 304, is switched to provide an output in correspondence with the passage of slot 229 on plate 225 in proper relation with the comparator 201. Thus, as the receptor 200 begins surveillance of the region F, as seen in FIG. 5, shortly thereafter the delayed impulse is applied to AND circuit 267 to reset both flip-flops 248 and 250 from a shifted condition. Thus during scanning of region F by receptor 200, relay winding R is de-energized and relay winding L being re-energized.

In the lower drawing portion associated with FIG. 6 there is shown an additional contact plate 252 for an associated mounting with the contact plate 245 underneath the receptor 252. This contact plate 252 is configured that contact times with the associated wiper correspond to a positioning of the receptor for surveillance of the region F.

In this lower circuit portion of FIG. 6, appropriate limit switches 253, are shown in the energizing circuit for the two relay windings R', L' for connection to the mechanical drive 206 for the head lamp controlled by apparatus in accordance with the invention. The effect of these mechanical arrangements will be more clear from a consideration of FIG. 7. Also shown in the lower circuit of FIG. 6 are two series-connected contact breakers, switches $r$ and $l$, in series connection with the windings R', L', respectively. As indicated by dashed lines, these contacts switches $l$, $r$ are respectively operated by the relay windings L, R, seen next above in FIG. 6. Thus, energizing of winding L operates switch $l$ to energize winding L' and conversely with switch $r$.

Figure 7:
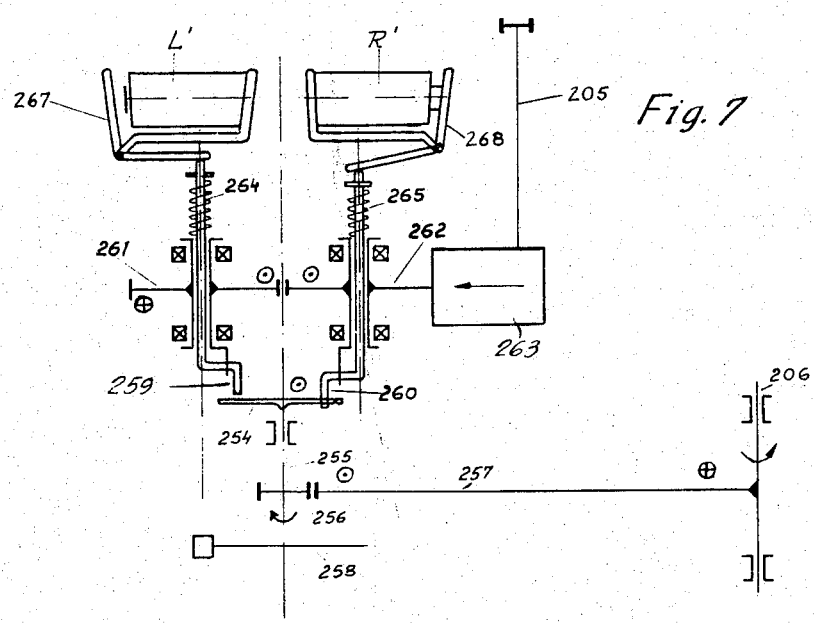
FIG. 7 is a partially diagrammatic elevation view of mechanical lamp drive arrangements for controlling the direction of casting illumination from a vehicle equipped with illuminating apparatus in accordance with the invention.

Looking next to FIG. 7, the mechanical implementation of the control effects achieved by the circuits of FIG. 6 becomes more clear. In this FIG. 7 the drive motor 263 is shown connected to axle 205 for driving receptor 200 and comparator 201 in continuous rotation.

The relay windings L' and R' are shown in a condition, with reference to FIG. 6, that winding R' is energized. Accordingly, by the bent handle, lever mechanism 268, this energizing attracts the upper portion of the right-hand lever 268 for rotation in a counter-clockwise direction into contact with a core of winding R'. Thus, the energized winding R' depresses the crank 260 against the restoring pressure of spring 265. Hence the lower portion of crank 260 enters into driving engagement with a slit plate 254 which is mounted for rotation with axle 255. Corresponding relations exist with the bent handle lever 267 and the magnet winding L'.

The slit plate 254 is a well known type gear in the configuration of a Maltese cross and has, therefore, four slots radially spaced thereabout. The shaft of crank 260, as is that of companion shaft 259, is driven continuously by the continuously operating drive motor 263 which acts through meshed gears 261 and 262 on both the crank shafts. Clearly these gears are driven in opposite rotation through the intermeshed gear relation. Thus, the cranks 259, 260 are continuously driven in opposite rotation by the drive motor 263. Correspondingly actual drive to the head light drive shaft 206 will vary in direction in dependence upon which of the shafts 259, 260 is engaged with plate 254. That one of the shafts is determined, it will be recalled, by which of the windings R', L' is energized in accordance with the circuit diagram of FIG. 6. This drive is for a single rotation step corresponding to the engagement of the cranks 259, 260 in a slot of the slit plate 254.

For definiteness, however, consideration is had below to the situation in which the crank 260 is engaged in driving relation with the slit plate 254. For this consideration conventional symbolism for indicating movement of the rotary member into and away from a plane of the drawing is employed in the drawing. Thus, the left hand portion of gear 262 is indicated as moving from the plane of the drawing toward the viewer. Accordingly, the engaged crank 260 moves the right hand portion of slit plate 254 toward the viewer and correspondingly the axle 255 is driven in rotation as indicated by the curved arrow. Gear 256 is mounted on this axle in engagement with gear 257 which is a sector gear for engaging a corresponding drive gear mounted on shaft 206. Accordingly, the sector gear 257 is driven in rotation with a right hand portion moving away from the viewer of FIG. 7 to drive the shaft 206 to which sector 257 is stationarily mounted in rotation as indicated by the curved arrow. Thus the lamp 202 as shown in FIG. 1 is moved one step to the right corresponding to the slot in the plate 254.

It is clear that in certain circumstances it may be advantageous to provide a more rapid movement of the head lights to the right than to the left in order to avoid dazzling of an approaching vehicle by light radiated from that head light. This desirable function is accomplished in accordance with a feature of the invention as illustrated in FIGS. 8 and 9 which are respectively elevation and plan views of gear arrangements in accordance with the invention alternative to those discussed in connection with FIG. 7.

In FIG. 8, the right-driving crank 260' is shown in disengaged relationship with a slit plate 254' of relatively small dimensions. The left-driving crank 259' is shown in engaged relation with a larger plate 254''. Both of these plates being mounted in fixed driving relation with the axle 255'. Accordingly by providing these alternatively driven plates of different dimensions, apparatus in accordance with the invention provides for selectively different rates of drive of the head lamp.

Looking to the plan view of FIG. 9, it is seen that the smaller dimensioned plate 254' comprises only six slots peripherally spaced for engagement with the right driving crank 260' and the larger dimensioned plate 254'' comprises twice that number of slots, that is, twelve slots uniformly spaced circumferentially about the plate. Accordingly, one revolution of the crank 259 imparts one-half the rotation to the axle 255' that is imparted by the right-driving crank 260'.

It will be clear to those skilled in the art that in accordance with the invention, other driving gear elements may be employed than the configuration illustrated in FIGS. 7, 8 and 9. Similarly, it will be clear to those skilled in the art that directing the beam of a head lamp may be effectively accomplished by rotating a screen across the head lamp. Further to preclude directing of the beam from the head lamp into the eyes of an oncoming driver. Numerous and varied embodiments of the invention will similarly occur readily to those skilled in the art.

What is sought to be secured by Letters Patent of the United States is:

1. A lighting apparatus adapted for mounting on a motor vehicle for casting ahead thrown beams directed other than to a headlight of an approaching vehicle which comprises, a receptor photocell detecting device for deriving an electrical scanning signal indicative of the presence and angle of incidence of light from said approaching vehicle headlight, drive means for rotating said detecting device to scan successive angular sectors for detecting said approaching vehicle, a headlight mounted on an axis on said motor vehicle for casting an ahead illuminating beam, stepped means for rotatably driving said last named beam in angular steps about said axis, and a storage device for storing said scanning signals comprising means actuable upon the storage of a complete scanning signal for enabling said stepped driving means.

2. Apparatus as set forth in claim 1 wherein said receptor photocell device comprises directive means for selectively admitting light to energize the photocell thereof in accordance with the angular orientation of said device.

3. Apparatus as set forth in claim 1 and, in combination therewith, comparator means having a first portion mounted for rotation with said detecting device, and a second portion mounted coaxially with said first portion for rotation following said stepped beam driving means, said second portion comprising a slotted plate member, and means responsive to the relative angular position of said first and second portions for deriving an electrical signal indicative of said relative angular position.

4. Apparatus as set forth in claim 3 wherein said comparator first portion comprises an opaque housing mounted for rotation about a first vertical axis with said receptor photocell detecting device, an illuminating device mounted interiorly of said housing, a horizontal receptacle portion in said housing for receiving a horizontal slotted plate member of said second portion, a photocell member responsive to light from said interiorly mounted illuminating device for generating an electrical signal, and optical means for directing light from said interiorly mounted device to said photocell member by way of a slot in said second portion slotted plate member, whereby an electrical signal is derived from said photocell member indicative of the relative position of said receptor photocell detecting device and said headlight.

5. Apparatus as set forth in claim 4 wherein said slotted plate member comprises a plurality of slots radially disposed about the axis of rotation of said slotted plate member, a first radial slot of said plurality being angularly positioned in correspondence with an edge of said headlight positioned oppositely to the direction of rotation of said detecting device, and the remaining slots of said plurality being respectively disposed oppositely of said first slot in correspondence with the angular positioning of selected inspection zones of said receptor.

6. Apparatus as set forth in claim 5 wherein a first and a second slot of said plurality define a first inspection zone for said receptor and wherein said actuable means comprises means responsive to an oncoming light signal in said inspection zone for dimming said headlight and for rotating said headlight toward said first slot.

7. Apparatus as set forth in claim 5 wherein a second and a third slot of said plurality define a second selected inspection zone of said receptor, said second zone being a test zone, said actuable means being responsive to light signals from an oncoming vehicle in said test zone for driving said headlight a step in the direction of said first slot.

8. Apparatus as set forth in claim 5 wherein a third and a forth slot of said plurality define a third inspection zone for said receptor, said actuable means being disabled, in response to light signals from said third zone, for inhibiting driving of said headlight to the left into the right.

9. Apparatus as set forth in claim 5 wherein said storage device comprises a ring counter arrangement having a plurality of stages corresponding in number to the slots of said plurality, said counter arrangement being responsive to signals from said comparator for stepping successive stages thereof, said counter comprising a stage corresponding to inspection zones defined by successive pairs of slots in said slotted plate member.

10. Apparatus as set forth in claim 5 wherein an inspection zone for said receptor corresponding to the interval between said fourth and first slotted plate slots, said inspection zone comprising a reset zone for said storing device, said storage device being responsive to reset zone indicating light signals from said comparator for enabling rotary drive to said headlight, returning said headlight toward the fourth slot.

11. Lighting apparatus adapted for mounting on a motor vehicle which comprises a scanning receptor driven in rotation and responsive to light signals received for generating an electrical signal indicative of the angular position of a light signal received, a head lamp for said vehicle, contact plate switching means on said receptor for interrupting illuminating current to said lamp in correspondence with the scanning by said receptor of the angular sectors for detecting the headlight of an approaching vehicle, illuminated by said lamp.

12. Lighting apparatus for mounting on a motor vehicle which comprises a scanning receptor driven in rotation and responsive to light signals received for generating an electrical signal indicative of the angular position of a source of said light signal, a rotatably mounted headlight for directing a headlamp beam in accordance with the rotary position of said lamp, stepped rotary drive means for said lamp, said last named means comprising a first slit plate having peripheral slots, first and second oppositely rotating drive cranks adapted for respectively and selectively engaging said peripheral slots, said shafts being continuously linked to said drive means, means linking said plate for rotating said lamp, and means responsive to said electrical signal for selectively engaging one of said drive cranks with a peripheral slot of said slit plate.

13. Apparatus as set forth in claim 12 and in combination therewith a second slit plate of dimensions differing from said first slit plate wherein said linking means comprises means for linking said first and second slit plates for rotating said lamp and wherein said electrical signal responsive means comprises means for selectively linking said continuously rotating drive cranks with a respectively associated one of said plates.

References Cited

UNITED STATES PATENTS

| | | | |
|---|---|---|---|
| 2,632,040 | 3/1953 | Rabinow | 250—214 |
| 2,753,487 | 7/1956 | Bone | 250—214 |
| 2,863,064 | 12/1958 | Rabinow | 250—214 |
| 2,915,642 | 12/1959 | Radin | 250—214 |

RALPH G. NILSON, *Primary Examiner.*

M. ABRAMSON, *Assistant Examiner.*

UNITED STATES PATENT OFFICE
CERTIFICATE OF CORRECTION

Patent No. 3,356,852                      December 5, 1967

Konrad Zuse

It is hereby certified that error appears in the above numbered patent requiring correction and that the said Letters Patent should read as corrected below.

In the drawings, Sheet 3, Fig. 3, the reference numeral 225 should be applied to the plate element attached to the support member 207; Sheet 4, Fig. 6, the legend AND should be applied so that each element 271 and 270 are thus designated, separately; column 2, line 72, for "are" read -- arc --; column 4, line 71, for "237" read -- 227 --; column 5, line 48, for "heertofore" read -- heretofore --; column 6, line 1, for "218" read -- 200 --; line 21, for "252" read -- 200 --; column 8, line 55, for "into" read -- or to --; line 61, for "a stage" read -- stages --; column 9, line 11, for "headlight" read -- headlamp --.

Signed and sealed this 11th day of February 1969.

(SEAL)
Attest:

Edward M. Fletcher, Jr.                EDWARD J. BRENNER
Attesting Officer                    Commissioner of Patents